(12) United States Patent
Seyler et al.

(10) Patent No.: US 10,799,831 B2
(45) Date of Patent: Oct. 13, 2020

(54) SCR-ACTIVE MATERIAL

(71) Applicant: Umicore AG & Co. KG, Hanau-Wolfgang (DE)

(72) Inventors: Michael Seyler, Mainaschaff (DE); Michael Lennartz, Frankfurt (DE); Frank-Walter Schuetze, Aschaffenburg (DE); Benjamin Barth, Alzenau (DE); Anke Schuler, Niedernberg (DE); Frank Welsch, Rodenbach (DE); Stephan Eckhoff, Alzenau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 16/323,845

(22) PCT Filed: Aug. 11, 2017

(86) PCT No.: PCT/EP2017/070399
§ 371 (c)(1),
(2) Date: Feb. 7, 2019

(87) PCT Pub. No.: WO2018/029328
PCT Pub. Date: Feb. 15, 2018

(65) Prior Publication Data
US 2019/0184338 A1  Jun. 20, 2019

(30) Foreign Application Priority Data

Aug. 11, 2016  (EP) .................................. 16183708

(51) Int. Cl.
| | | |
|---|---|---|
| *B01J 29/06* | (2006.01) | |
| *B01D 53/94* | (2006.01) | |
| *B01J 29/83* | (2006.01) | |
| *B01J 35/00* | (2006.01) | |
| *B01J 29/76* | (2006.01) | |
| *B01J 29/00* | (2006.01) | |
| *B01J 29/56* | (2006.01) | |
| *B01J 29/85* | (2006.01) | |
| *B01J 29/89* | (2006.01) | |
| *B01J 29/70* | (2006.01) | |

(52) U.S. Cl.
CPC ........ *B01D 53/9418* (2013.01); *B01J 29/005* (2013.01); *B01J 29/56* (2013.01); *B01J 29/763* (2013.01); *B01J 29/83* (2013.01); *B01J 29/85* (2013.01); *B01J 29/89* (2013.01); *B01J 35/0006* (2013.01); *B01J 35/008* (2013.01); *B01J 35/0086* (2013.01); *B01D 2251/2062* (2013.01); *B01D 2255/2092* (2013.01); *B01D 2255/20761* (2013.01); *B01D 2255/50* (2013.01); *B01D 2258/012* (2013.01); *B01J 29/7015* (2013.01); *B01J 2229/183* (2013.01); *B01J 2229/186* (2013.01); *B01J 2229/20* (2013.01); *B01J 2229/42* (2013.01)

(58) Field of Classification Search
CPC ........ B01J 29/005; B01J 29/76; B01J 29/763; B01J 29/83; B01J 29/85; B01J 29/89; B01J 29/56; B01J 2229/183; B01J 2229/186; B01J 2229/20; B01J 2229/42; B01J 35/0086; B01J 35/0006; B01J 35/008; B01J 35/0093; B01J 37/0201; B01J 37/0045; B01J 37/0215; B01J 37/10; B01J 37/30; B01D 53/9418; B01D 2255/20761; B01D 2255/50; B01D 2258/012
USPC ..... 502/60, 8, 63, 64, 67, 69; 422/177, 180; 423/235, 239.1, 239.2
See application file for complete search history.

(56) References Cited

U.S. PATENT DOCUMENTS

| | | | | |
|---|---|---|---|---|
| 8,911,697 | B2 * | 12/2014 | Soeger ............... | B01D 53/9418 423/213.2 |
| 2015/0037233 | A1 * | 2/2015 | Fedeyko ............ | B01D 53/9418 423/239.1 |
| 2017/0218809 | A1 * | 8/2017 | Hoyer ................ | B01D 53/9422 |

FOREIGN PATENT DOCUMENTS

| | | |
|---|---|---|
| EP | 2985068 A1 | 2/2016 |
| JP | 2012215166 A | 11/2012 |
| WO | 2008106519 A1 | 9/2008 |
| WO | 2008118434 A1 | 10/2008 |
| WO | 2008132452 A2 | 11/2008 |
| WO | 2012117042 A2 | 9/2012 |
| WO | 2013060341 A1 | 5/2013 |
| WO | 2017216012 A1 | 12/2017 |
| WO | 2018015930 A1 | 1/2018 |

OTHER PUBLICATIONS

Machine translation of JP 2012 215166, Nov. 2012.*
Mathisen et al., "In situ XAS and IR studies on Cu:SAPO-5 and Cu:SAPO-11; the contributory role of monomeric linear copper (I) species in the selective catalystic reduction of NOx by propene", Phys. Chem. Chem. Phys. 2009, 11, 5476-5488.*
Frache, et al., "CuAPSO-34 Catalysts for N2O Decomposition in the Presence of H2O. A Study of Zeolitic Structure Stability in Comparison to Cu-SAPO-34 and Cu-ZSM-5", Jan. 2003, pp. 5557, vol. 22, No. 1-2, Publisher: Topics in Catalysis.
Guo, et al., Feb. 1, 2014, pp. 634-639, vol. 6, No. 2, Publisher: ChemCatChem.
Ishihara, et al., "Copper Ion-Exchanged SAPO-34 as a Thermostable Catalyst for Selective Reduction of NO with C3H6", Jul. 1, 1997, pp. 93-102, vol. 169, No. 1, Publisher Journal of Catalysis.
Korhonen, et al., "Isolated Cu2+ ions: active sites for selective catalytic reduction of NO", Nov. 29, 2010, pp. 800-802, vol. 47, Publisher: Chemical Communications.

(Continued)

*Primary Examiner* — Elizabeth D Wood
(74) *Attorney, Agent, or Firm* — Suzannah K. Sundby, Esq.; Canady + Lortz LLP

(57) ABSTRACT

The present invention relates to an SCR-active material, comprising a small-pore zeolite, aluminum oxide and copper, characterized in that it contains 5 to 25 wt-% of aluminum oxide in relation to the entire material and that the copper is present on the aluminum oxide in a first concentration and on the small-pore zeolite in a second concentration.

20 Claims, 1 Drawing Sheet

(56) References Cited

OTHER PUBLICATIONS

Kwak, et al., "Size-Dependent Catalytic Performance of CuO on -Al2O3: NO Reduction versus NH3 Oxidation", May 25, 2012, pp. 14321440, vol. 2, No. 7, Publisher: ACS Catalysis.
Torre-Abreu, et al., "Selective catalytic reduction of NO on copper-exchanged zeolites: the role of the structure of the zeolite in the nature of copper-active sites", Dec. 17, 1999, pp. 407-418, vol. 54, No. 4, Publisher: Catalysis Today.
International Preliminary Report on Patentability received in PCT/EP2017/070399 dated Feb. 12, 2019.
International Search Report received in PCT/EP2017/070399 dated Nov. 6, 2017.
Written Opinion received in PCT/EP2017/070399 dated Nov. 6, 2017.

\* cited by examiner

SCR-ACTIVE MATERIAL

The present invention relates to an SCR-active material for reducing nitrogen oxides in the exhaust gas of combustion engines.

Exhaust gases from motor vehicles with a predominantly lean-operated combustion engine contain, in particular, the primary emissions of carbon monoxide CO, hydrocarbons HC, and nitrogen oxides NOx in addition to particle emissions. Due to the relatively high oxygen content of up to 15 vol. %, carbon monoxide and hydrocarbons may relatively easily be rendered harmless by means of oxidation; however, reducing nitrogen oxides to nitrogen is much more difficult.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia. The ammonia used as reducing agent may be made available by feeding an ammonia precursor compound, for example urea, ammonium carbamate, or ammonium formate, into the exhaust gas stream, and by subsequent hydrolysis.

Certain metal-exchanged zeolites can be used as SCR catalysts, for example. Zeolites are often subdivided by the ring size of their largest pore openings into large, medium, and small-pored zeolites. Large-pore zeolites have a maximum ring size of 12 and medium-pore zeolites have a maximum ring size of 10. Small-pore zeolites have a maximum ring size of 8.

While, for example, SCR catalysts based on iron-exchanged β-zeolites, i.e. a large-pore zeolite, have been and will continue to be widely used in heavy-duty vehicles, SCR catalysts based on small-pore zeolites are becoming increasingly important, see for example WO2008/106519 A1, WO2008/118434 A1 and WO2008/132452 A2. In particular, SCR catalysts on the basis of copper chabazite were most recently the focus in this respect.

The known SCR catalysts are capable of converting nitrogen oxides with high selectivity with ammonia as reducing agent to nitrogen and water. However, starting from about 350° C., the so-called parasitic ammonia oxidation occurs in copper chabazite-based catalysts and competes with the desired SCR reaction. Here the reducing agent ammonia reacts in a series of side reactions with oxygen to form dinitrogen, nitrous oxide, nitric monoxide or nitrogen dioxide, so that either the reducing agent is not utilized effectively or even additional amounts of nitrogen oxides are formed from the ammonia. This competition is particularly pronounced at high temperatures in the range of 500 to 650° C., as it can occur in the regeneration of diesel particulate filters (DPF) in the exhaust gas line at the SCR catalyst. Furthermore, it must be ensured that the catalyst materials are ageing-resistant in order to be able to achieve high pollutant conversions over the entire service life of a motor vehicle. Therefore, in order to achieve high conversions even at the reaction temperatures during a DPF regeneration and over the service life, a need for improved SCR catalyst materials exists.

WO 2008/132452 A2 describes a small-pored zeolite exchanged with, for example, copper, which can be coated as a washcoat onto a suitable monolithic substrate or extruded to form a substrate. The washcoat may contain a binder selected from the group consisting of aluminum oxide, silica, (non-zeolitic) silica-alumina, natural clays, $TiO_2$, $ZrO_2$, and $SnO_2$.

WO 2013/060341 A1 describes SCR-active catalyst compositions from a physical mixture of an acidic zeolite or zeotype in protonic form or in iron-promoted form with, for example, $Cu/Al_2O_3$.

ACS Catal. 2012, 2, 1432-1440 describes pathways of ammonia on $CuO/_\gamma$—$Al_2O_3$ during $NH_3$—SCR reactions. While ammonia reacted with 0.5 wt-% $CuO/_\gamma$—$Al_2O_3$ in particular with nitrogen monoxide to form nitrogen, it reacts with 10 wt-% $CuO/_\gamma$—$Al_2O_3$, particularly with oxygen to form nitrogen oxides.

JP 2012-215166 describes a method in which an SAPO-type zeolite is mixed with boehmite and a cylindrical honeycomb body is extruded from this mixture, which body is subsequently immersed in a copper nitrate solution.

It has now surprisingly been found that certain SCR materials based on a small-pore zeolite, aluminum oxide and copper meet the above-mentioned requirements.

The present invention relates to an SCR-active material that comprises
(i) small-pore zeolites,
(ii) aluminum oxide, and
(iii) copper,
characterized in that it contains 5 to 25 wt-% aluminum oxide based on the entire material and the copper is present on the aluminum oxide in a first concentration and on the small-pore zeolite in a second concentration.

The wording, according to which copper is present on the zeolite, includes within the scope of the present invention the presence of copper as part of the lattice backbone of the zeolite, the presence of copper in ion-exchanged form in pores of the zeolite backbone, and any other form in which copper may be bound within the three-dimensional zeolite backbone or on its surface.

Also, the wording, according to which copper is present on the alumina, comprises all forms in which copper may be bonded within the three-dimensional aluminum oxide backbone or on the surface thereof. This also includes mixed oxides, such as copper aluminate ($CuAl_2O_4$).

The term copper in any case comprises both metallic copper and ionic copper, as well as copper oxide.

Furthermore, in the context of the present invention, the term "aluminum oxide" does not comprise the proportion of aluminum oxide in the zeolite lattice of the zeolite. "Aluminum oxide" thus comprises only the component according to (ii) and not the proportion of aluminum oxide, which results from the $SiO_2/Al_2O_3$ ratio (SAR) of the zeolite.

The total amount of copper calculated as CuO and based on the total SCR-active material is in particular from 1 to 15 wt-%, preferably from 1 to 10 wt-% and more preferably 2 to 5 wt-%.

It should be taken into account that the preferred amount of copper in relation to the zeolite is dependent upon the $SiO_2/Al_2O_3$ ratio of the zeolite. It generally applies that the amount of exchangeable copper decreases as the $SiO_2/Al_2O_3$ ratio of the zeolite increases. According to the invention, the preferred atomic ratio of the copper exchanged in the zeolite to framework aluminum in the zeolite, hereinafter referred to as Cu/Al ratio, is in particular 0.25 to 0.6.

This corresponds to a theoretical degree of exchange of the copper with the zeolite of 50% to 120%, assuming a complete charge balance in the zeolite via bivalent Cu ions given a degree of exchange of 100%. Cu/Al values of 0.35-0.5, which corresponds to a theoretical degree of Cu exchange of 70-100%, are particularly preferred.

The Cu/Al ratio is a widely used measure for characterization of copper exchanged zeolites, see for example WO 2008/106519 A1, Catalysis Today 54 (1999) 407-418

(Torre-Abreu et. al.), Chem. Commun., 2011, 47, 800-802 (Korhonen et al.), or ChemCatChem 2014, 6, 634-639 (Guo et al.). The person skilled in the art is thus familiar with this quantity.

The Cu/Al ratio can be determined, for example, by means of optical emission spectrometry with inductively coupled plasma (ICP OES). This method is known to the person skilled in the art.

It is particularly advantageous if the first concentration (the concentration of copper on the aluminum oxide) is higher than the second concentration (the concentration of copper on the zeolite). Preferably, the first concentration is at least 1.5 times, more preferably at least 3 times, higher than the second concentration. For example, the first concentration is 1.5 to 20 times or 3 to 15 times higher than the second concentration.

The ratio of the first and second concentrations can be determined using transmission electron spectroscopy (TEM) and energy-dispersive X-ray spectroscopy (EDX). For this purpose, a thin section of the SCR-active material according to the invention is prepared and by means of EDX the concentration of copper in areas of the zeolite and in areas of the aluminum oxide is determined and put into proportion. This method is known to the person skilled in the art and described in the literature.

In one embodiment, the SCR-active material according to the invention is free of noble metals, such as platinum, palladium and rhodium.

The small-pore zeolites are aluminosilicates, for example. All zeolites of this type that are known to the person skilled in the art may be used. These include naturally occurring but preferably synthetically produced small-pore zeolites. Examples of synthetically prepared small-pore zeolites belong to the structure types ABW, ACO, AEI, AEN, AFN, AFT, AFX, ANA, APC, APD, ATN, ATT, ATV, AWO, AWW, BIK, BRE, CAS, CDO, CHA, DDR, DFT, EAB, EDI, EPI, ERI, ESV, GIS, GOO, IHW, ITE, ITW, JBW, KFI, LEV, LTA, LTJ, MER, MON, MTF, NSI, OWE, PAU, PHI, RHO, RTE, RTH, SAS, SAT, SAV, SIV, THO, TSC, UEI, UFI, VNI, YUG and ZON. Preferred small-pore zeolites are those belonging to the structure types AEI, CHA (chabazite), ERI (erionite), LEV (levyne), AFX, DDR and KFI or those belonging to the structure types AEI, CHA (chabazite), ERI (erionite), AFX, DDR and KFI. Particularly preferred are the structure types CHA, AEI, ERI and LEV, or the structure types CHA, AEI and ERI. Very particularly preferred are the structure types CHA and LEV or CHA.

In embodiments of the present invention, the small-pore zeolites of the aluminosilicate type have an SAR value of 5 to 50, preferably 14 to 40, particularly preferably between 20 and 35.

In the context of the present invention, the term zeolite does not only include the above-described aluminosilicates, but also so-called zeolite-like materials of the silicoaluminophosphates and aluminophosphates type. Suitable silicoaluminophosphates or aluminophosphates also belong, in particular, to the structure types AEI, CHA (chabazite), ERI (erionite), LEV (levyne), AFX, DDR and KFI. Such materials may be found under the relevant three-letter code of the Structure Database of the International Zeolite Association under Related Materials (http://www.iza-structure.org/databases/).

Examples include SAPO-17, SAPO-18, SAPO-34, SAPO-35, SAPO-39, SAPO-43, SAPO-47 and SAPO-56 or AlPO-17, AlPO-18, AlPO-34 and AlPO-35. The aforementioned preferred SAR values of aluminosilicates do not apply to these materials.

The average crystallite size ($d_{50}$) of the small-pore zeolite is, for example, 0.1 to 20 μm, preferably 0.5 to 10 μm, more preferably 1 to 4 μm.

Aluminum oxide with a BET surface area of 30 to 250 $m^2/g$, preferably 100 to 200 $m^2/g$ (determined according to ISO 9277), is particularly suitable as aluminum oxide. Such materials are known to the person skilled in the art and are commercially available.

In addition, aluminum oxides that are doped with further elements in order to improve the physical or chemical properties come into consideration. Known elements are, for example, Si, Mg, Y, La and elements of lanthanides, such as Ce, Pr, Nd, which can form mixed oxide compounds with the aluminum and can thus, for example, change the acidity or surface stability. The doping of aluminum oxide with one or a plurality of elements should be less than 15 wt-% based on the respective mixed oxide, preferably less than 10 wt-%, particularly preferably less than 5 wt-%.

The aluminum oxides can be used as such, wherein it is, however, preferred that the aluminum oxide be formed from a suitable precursor, such as a boehmite or an aluminum salt, such as aluminum nitrate, within the scope of the preparation of the SCR-active material.

In one embodiment of the present invention, the SCR-active material is present in a form in which the small-pore zeolite forms a core and the aluminum oxide forms a shell encasing the core. Such structures are known as core/shell structures and are described, for example, in WO 2012/117042 A2.

In one embodiment of the present invention, the SCR-active material is present as a powder.

In another embodiment of the present invention, the SCR-active material is present in the form of a coating suspension comprising
a) an SCR-active material, that comprises a
(i) small-pore zeolite,
(ii) aluminum oxide, and
(iii) copper,
wherein it contains from 5 to 25 wt-% aluminum oxide based on the total material, and the copper is present on the aluminum oxide in a first concentration and on the small-pore zeolite in a second concentration and
b) water.

In one embodiment, the coating suspension according to the invention contains 20 to 55 wt-% SCR-active material and 45 to 80 wt-% water, based in each case on the weight of the coating suspension.

In another embodiment, the coating suspension according to the invention contains 30 to 50 wt-% SCR-active material and 50 to 70 wt-%, based in each case on the weight of the coating suspension.

The SCR-active material according to the invention can, for example, be prepared by drying and subsequently calcining an aqueous suspension of the small-pore zeolite, copper salt, and aluminum oxide, or a precursor compound of aluminum oxide.

For example, a small-pore zeolite is placed in water, a soluble copper salt is added while stirring and then the aluminum oxide or a corresponding aluminum oxide precursor is added. The resulting suspension of the SCR-active material according to the invention in water can be directly used as coating suspension. However, it can also be filtered and/or dried, wherein in the latter case the SCR-active material according to the invention is obtained in powder form.

It is likewise possible, for example, after the drying and calcination of the aqueous suspension consisting of the small-pore zeolite, the aluminum oxide or the aluminum oxide precursor compound and the copper salt, to resuspend the obtained material with aluminum oxide or a corresponding aluminum oxide precursor in aqueous solution, to dry it and to calcine again and thus prepare the SCR-active material according to the invention in powder form.

The coating suspension according to the invention can be obtained in a simple manner from the SCR-active material in powder form by adding water while stirring and optionally grinding.

Preferred soluble copper salts are salts that are soluble in water, such as copper sulfate, copper nitrate, and copper acetate. Copper nitrate and copper acetate are particularly preferred, and copper acetate is very particularly preferred.

The type of drying can be carried out by different methods. For example, spray drying, microwave drying, belt drying, roller drying, condensation drying, drum drying, freeze drying, and vacuum drying are known to the person skilled in the art. Spray drying, belt drying, roller drying, and freeze drying are preferred. Spray drying is particularly preferred. In this case, the suspension is introduced by means of an atomizer into a hot gas stream, which dries it in a very short time (a few seconds to fractions of a second) to form the SCR-active material. Optionally, the material is calcined subsequently, for example at temperatures of 500° C. to 900° C. in air or an air/water mixture. The calcination is preferably effected at temperatures between 550° C. to 850° C., most preferably at 600° C. to 750° C.

In a further embodiment of the present invention it is possible, for example, after washing and drying, and optionally calcination of the aqueous suspension consisting of the small-pore zeolite and of the copper salt (or a zeolite already synthesized with copper), to suspend the material thus obtained with aluminum oxide or a corresponding aluminum oxide precursor in aqueous solution, to dry and to calcine again, and thus prepare the SCR-active material according to the invention. This material can subsequently be resuspended in water, optionally ground, provided with binder and coated.

$Al_2O_3$, $SiO_2$, $TiO_2$, or $ZrO_2$ or their precursors, as well as mixtures thereof, can, for example, be used as a binder for coating flow-through substrates. Binders are usually not required in the coating of filter substrates.

For the sake of clarity, it is pointed out here that the aluminum oxide or the aluminum oxide precursor for producing the SCR-active material according to the invention differs from aluminum-containing binder materials in that:
1. it is used already during the preparation of the SCR-active material and not only to improve the adhesive strength of the catalytically active material on a flow-through substrate
2. A portion of the copper is present on the aluminum oxide
3. The SCR-active material containing the aluminum oxide or aluminum oxide precursor is calcined prior to coating on a substrate, whereby the typical binder properties are lost.
4. The aluminum oxide is also used for preparing the SCR-active material according to the invention when the porous walls of a filter substrate are to be coated (for example, in an in-wall coating of a wall flow filter) in order to increase the thermal stability of the catalytically active material. The use of a binder is not necessary in this case since the binding properties of the binder are not required when the catalytically active material is located inside the pores of the filter. Additionally, added binder would further lead to an undesirable increase in backpressure across the filter, where otherwise the amount of coated catalytically active material would remain the same.
5. It contributes to an increase of $NO_x$ conversion after thermal aging of the SCR-active material according to the invention and is not classified as catalytically inactive.

In this case, the SCR-active material according to the invention can satisfy one or more or all of the points mentioned above.

In embodiments of the present invention, the SCR-active material according to the invention is present in the form of a coating on a carrier substrate.

Carrier substrates can be so-called flow-through substrates or wall-flow filters. They may consist, for example, of silicon carbide, aluminum titanate, cordierite, or metal. They are known to the person skilled in the art and are commercially available. The application of the SCR-active material according to the invention to the carrier substrate can be carried out by methods familiar to the person skilled in the art, for example by the customary dip coating methods or pumping and suction coating methods with subsequent thermal aftertreatment (calcination).

The person skilled in the art knows that in the case of wall-flow filters, their average pore size and the average particle size of the SCR-active material according to the invention can be adapted to each other, such that the resulting coating lies on the porous walls that form the channels of the wall-flow filter (on-wall coating). However, average pore size and average particle size are preferably adapted to one another such that the SCR-active material according to the invention is located in the porous walls that form the channels of the wall-flow filter, so that a coating of the inner pore surfaces thus takes place (in-wall coating). In this case, the average particle size of the SCR-active material according to the invention must be small enough to penetrate into the pores of the wall-flow filter.

The present invention also relates to embodiments, in which the SCR-active material was extruded to a substrate by means of a matrix component. The carrier substrate is in this case formed from an inert matrix component and the SCR-active material according to the invention.

Carrier substrates, flow-through substrates and wall flow substrates that do not just consist of inert material, such as cordierite, but additionally contain a catalytically active material are known to the person skilled in the art. To produce them, a mixture consisting of, for example, 10 to 95% by weight of an inert matrix component and 5 to 90% by weight of catalytically active material is extruded according to a method known per se. All of the inert materials that are also otherwise used to produce catalyst substrates can be used as matrix components in this case. These are, for example, silicates, oxides, nitrides, or carbides, wherein in particular magnesium aluminum silicates are preferred.

The extruded carrier substrates comprising SCR-active material according to the invention may be used as such for exhaust gas purification. However, they can also be coated by customary methods with further catalytically active materials in the same way as inert carrier substrates.

However, the SCR-active material according to the invention is preferably not present as an extrudate, in particular not as an extrudate exclusively consisting of the SCR-active material according to the invention, i.e. containing no matrix component.

The SCR-active material according to the invention may advantageously be used to purify exhaust gas from lean-operated internal combustion engines, particularly diesel engines. It converts the nitrogen oxides present in the exhaust gas into the harmless compounds nitrogen and water.

The present invention thus also relates to a method for purifying the exhaust gas of lean-operated combustion engines, characterized in that the exhaust gas is passed over an SCR-active material according to the invention.

This passage usually takes place in the presence of a reducing agent. In the method according to the invention, ammonia is preferably used as reducing agent. For example, the required ammonia may be formed in the exhaust gas system upstream of the particle filter according to the invention, e.g., by means of an upstream nitrogen oxide storage catalyst ("lean $NO_x$ trap"—LNT), in particular during operation under rich exhaust gas conditions. This method is known as "passive SCR." However, ammonia may also be carried along in the "active SCR method" in the form of an aqueous urea solution that is dosed in as needed via an injector upstream of the particle filter according to the invention.

The present invention thus also relates to a device for purifying exhaust gas from lean-operated internal combustion engines, which is characterized in that it comprises an SCR-active material according to the invention, preferably in the form of a coating on an inert carrier material and a means for providing a reducing agent.

Ammonia is usually used as reducing agent. In one embodiment of the device according to the invention, the means for providing a reducing agent is therefore an injector for aqueous urea solution. The injector is generally fed with aqueous urea solution which originates from a carried-along reservoir, i.e., for example, a tank.

In another embodiment, the means for providing a reducing agent is a nitrogen oxide storage catalyst capable of forming ammonia from nitrogen oxide. Such nitrogen oxide storage catalysts are known to the person skilled in the art and are described extensively in the literature.

It is, for example, known from SAE-2001-01-3625 that the SCR reaction with ammonia proceeds more quickly if the nitrogen oxides are present in a 1:1 mixture of nitrogen monoxide and nitrogen dioxide, or in any event approach this ratio. Since the exhaust gas of lean-operated combustion engines normally has an excess of nitrogen monoxide compared to nitrogen dioxide, the document proposes to increase the proportion of nitrogen dioxide with the aid of an oxidation catalyst.

In one embodiment, the device according to the invention therefore also comprises an oxidation catalyst. In embodiments of the present invention, platinum on a carrier material is used as oxidation catalyst.

All materials that are known to the person skilled in the art for this purpose are considered as carrier materials. They have a BET surface of 30 to 250 $m^2/g$, preferably of 100 to 200 $m^2/g$ (specified according to ISO9277), and are in particular aluminum oxide, silicon oxide, magnesium oxide, titanium oxide, zirconium oxide, cerium oxide, and mixtures or mixed oxides of at least two of these oxides. Aluminum oxide and aluminum/silicon mixed oxides are preferred. If aluminum oxide is used, it is particularly preferably stabilized, for example with lanthanum oxide.

The device according to the invention is designed in such a way, that in the direction of flow of the exhaust gas are arranged first the oxidation catalyst, then the injector for aqueous urea solution and then the SCR-active material according to the invention, preferably in the form of a coating on an inert carrier material. Alternatively, a nitrogen oxide storage catalyst and then the SCR-active material according to the invention, preferably in the form of a coating on an inert carrier material, are first arranged in the flow direction of the exhaust gas. During the regeneration of the nitrogen oxide storage catalyst, ammonia can be formed under reductive exhaust gas conditions. Oxidation catalysts and injectors for aqueous urea solution are superfluous in this case.

Surprisingly, the SCR-active material according to the invention has advantages compared to conventional copper-exchanged small-pore zeolites. In particular it is distinguished by higher nitrogen oxide conversion rates at reaction temperatures between 500 and 650° C.

The invention is explained in more detail in the following examples and figures.

EXAMPLE 1 a) Preparation of a Material EM-1 According to the Invention 100.4 grams of copper(II)-acetate-1-hydrate and 960 grams of ammonium chabazite with an $SiO_2/Al_2O_3$-ratio of 30 are slurried in 2500 grams of water. The resulting suspension is stirred for 2 hours. To this are added 400 grams of boehmite sol with a content of 20 wt-% $Al_2O_3$. Stirring is then continued for 2 hours.

The final suspension is converted in a spray dryer to a dry powder, which is then calcined for 2 hours at 500° C. in air.

b) Characterization of the Cu Distribution of EM-1 Between Zeolite and Aluminum Oxide The material EM-1 obtained according to step a) is embedded in a finely dispersed manner in a polymer resin. Thin-section samples are then prepared and examined in the transmission electron microscope. An exemplary TEM image of the material is shown in FIG. 1. The regions of the aluminum oxide and zeolite can be clearly distinguished based on the aluminum content determined by EDX and by the morphology. It shows a section of a zeolite crystallite with an aluminum oxide casing. 2 regions were marked in the receptacle to illustrate the differences between the aluminum oxide (region A) and the zeolite region (region B). At these two locations, the copper concentration was determined in weight percent by EDX and the concentration determined in region A was divided by the concentration determined in region B.

Analogously, this procedure was carried out on further TEM images of zeolite crystallites with aluminum oxide casing in order to allow statistical evaluation. In all cases, it was found that the concentration of copper in the region of the aluminum oxide shell was markedly higher than on the zeolite, as can be inferred from the following table.

| | Concentration Cu on $Al_2O_3$ [wt-%] divided by concentration of Cu on the zeolite [wt-%] according to TEM/EDX |
|---|---|
| Sample 1 | 8.7 |
| Sample 2 | 3.2 |
| Sample 3 | 4.8 |

COMPARATIVE EXAMPLE 1

Preparation of Comparative Material VM-1

100.4 grams of copper(II)acetate-1-hydrate and 960 grams of ammonium chabazite with a $SiO_2/Al_2O_3$-ratio of 30 are slurried in 2500 grams of water. The resulting suspension is stirred for 2 hours. Unlike example 1, no boehmite sol is added. The final suspension is converted in a spray dryer to a dry powder, which is calcined for 2 hours at 500° C. in air.

The amount of copper used in this preparation, based on the zeolite, is thus the same as in Example 1. However, no additional $Al_2O_3$ is present in the material on which copper can spread.

Comparison of the Catalytic Activity of EM-1 and VM-1

The SCR activity of the EM-1 material and the VM-1 material is tested on a powder reactor. For this purpose, 200 mg of the corresponding material are each introduced into a U-tube reactor of quartz glass and fixed with quartz wool.

The nitrogen oxide conversion at a reaction temperature of 450° C. is determined in each case under the following measuring conditions: 500 ppm nitric oxide, 750 ppm ammonia, 5% water, 5% oxygen, balance nitrogen, flow $cm^3$/min (mL/min).

The EM 1-material provides 96% $NO_x$ conversion, whereas the VM-1 material provides 89% $NO_x$ conversion, only.

EXAMPLE 2

Preparation of a Coated Honeycomb Body WEM-1 with EM-1 Material 950 grams of EM-1 material and 250 grams of boehmite sol containing 20 weight percent $Al_2O_3$ are made into a suspension with water. The added boehmite sol serves as a binder system in order to achieve good adhesion of the EM-1 material to a commercially available cordierite honeycomb body.

The resulting suspension thus contains the following compounds or components according to sample weight and calculation of copper as CuO:

| Compounds/component | Origin | Proportion | |
|---|---|---|---|
| CuO | ex EM-1 powder | 3.5 wt-% | |
| Zeolite | ex EM-1 powder | 84.5 wt-% | |
| Aluminum oxide | ex EM-1 powder | 7.0 wt-% | Total |
| Aluminum oxide | ex binder system | 5.0 wt-% | 12.0 wt-% |

Via a common dip method, a cordierite honeycomb body (14.4 cm (5.66 inches) diameter, 7.6 cm (3 inches) length, 62 cpscm (400 cpsi) cellular character and 0.15 mm (6 mil) wall thickness) is coated with a washcoat loading of 150 g/L catalyst volume, dried at 90° C. and annealed at 500° C.

COMPARATIVE EXAMPLE 2

Preparation of a Coated Honeycomb Body WVM-1 with VM-1 Material 880 grams of VM-1 material and 600 grams of boehmite sol containing 20 weight percent $Al_2O_3$ are made into a suspension with water. Via a common dip method, a cordierite honeycomb body (14.4 cm (5.66 inches) diameter, 7.6 cm (3 inches) length, 62 cpscm (400 cpsi) cellular character and 0.15 mm (6 mil) wall thickness) is coated with a washcoat loading of 150 g/L catalyst volume, dried at 90° C. and annealed at 500° C.

The resulting suspension thus contains proportionately the same amounts of the following components as Example 2, wherein unlike Example 2, this time the aluminum oxide component is derived exclusively from the binder.

| Component | Origin | Proportion |
|---|---|---|
| CuO | ex EM-1 powder | 3.5 wt-% |
| Zeolite | ex EM-1 powder | 84.5 wt-% |
| Aluminum oxide | ex binders | 12.0 wt-% |

Comparison of the Catalytic Activity of WEM-1 and WVM-1 a) In a Fresh State

A bore core with a 2.54 cm (1 inch) diameter and 7.6 cm (3 inches) length was drilled out of the two honeycomb bodies WEM-1 and WVM-1 and tested for their catalytic activity in a model gas system.

The following measurement condition was selected: 500 ppm NO, 750 ppm $NH_3$, 5 vol-% $H_2O$, 10 vol-% $O_2$, residual $N_2$ at a space velocity of 60000 $h^{-1}$ at reaction temperatures of 500° C. and 650° C.

At both measurement temperatures, WEM-1 has higher $NO_x$ conversions compared to WVM-1.

| | Reaction temperature | |
|---|---|---|
| | 500° C. | 650° C. |
| WEM-1 | 97% $NO_x$ conversion | 58% $NO_x$ conversion |
| WVM-1 | 95% $NO_x$ conversion | 54% $NO_x$ conversion | b) After Aging

The two drill cores of WEM-1 and WVM-1 were treated at 750° C. for 16 hours in a gas mixture of 10 vol-% water, 10 vol-% oxygen and 80 vol-% nitrogen in order to simulate aging of the catalysts during driving operation.

After this simulated aging, the catalytic activity under the above conditions indicated under a) is tested again. The catalyst WEM-1 based on the material EM-1 according to the invention has significantly higher $NO_x$ conversion rates than the comparative catalyst WVM-1.

| | Reaction temperature | |
|---|---|---|
| | 500° C. | 650° C. |
| WEM-1 | 85% $NO_x$ conversion | 43% $NO_x$ conversion |
| WVM-1 | 82% $NO_x$ conversion | 28% $NO_x$ conversion |

EXAMPLE 3

The material EM-1 according to the invention is coated with a washcoat load of 100 g/L as an in-wall coating onto a silicon carbide filter substrate. The coated filter FEM-1 is obtained.

COMPARATIVE EXAMPLE 3

Analogously to Example 3, a silicon carbide filter substrate is coated with the comparative material VEM-1. The coated filter FVM-1 is obtained.

Comparison of the Catalytic Activity of FEM-1 and FVM-1

In each case one drill core is removed from both coated filters according to Example 3 and Comparative Example 3. These are treated at 800° C. for 16 hours in a gas mixture of 10 vol-% water, 10 vol-% oxygen and 80 vol-% nitrogen in order to simulate the hard aging of a particulate filter coated with an SCR-active material during driving operation.

Subsequently, both drill cores are measured using the model gas under the following measurement condition: 500 ppm NO, 750 ppm $NH_3$, 5 vol-% $H_2O$, 10 vol-% $O_2$, residual $N_2$ at a space velocity of 100,000 $h^{-1}$ at a reaction temperature of 650° C.

While FVM-1 only achieves an $NO_x$ conversion of 8%, the FEM-1 sample converts 18% of the dosed nitrogen oxides.

The invention claimed is:

1. An SCR-active material comprising
   (i) small-pore zeolites,
   (ii) aluminum oxide, and
   (iii) copper,
   wherein it contains 5 to 25 wt-% aluminum oxide based on the entire material and the copper is present on the aluminum oxide in a first concentration and on the small-pore zeolite in a second concentration,
   wherein the total amount of copper calculated as CuO and based on the total SCR-active material is 1 to 15 wt-%,
   wherein the first concentration is higher than the second concentration, and
   Wherein the small-pore zeolite forms a core and the aluminum oxide forms a shell encasing said core.

2. The SCR-active material according to claim 1, wherein the first concentration is at least 1.5 times higher than the second concentration.

3. The SCR-active material according to claim 1, wherein the zeolite has an atomic ratio of copper to framework aluminum of 0.25-0.6.

4. The SCR-active material according to claim 1, wherein the small-pore zeolite is an aluminosilicate and belongs to the structure type AEI, CHA (chabazite), ERI (erionite), LEV (levyne), AFX, DDR, or KFI.

5. The SCR-active material according to claim 4, wherein the small-pore zeolite has an SAR value of 5 to 50.

6. The SCR-active material according to claim 1, wherein the small-pore zeolite is a silicoaluminosilicate or aluminophosphate and belongs to the structure type AEI, CHA (chabazite), ERI (erionite), LEV (levyne), AFX, DDR, or KFI.

7. The SCR-active material according to claim 1, wherein the average crystallite size (d50) of the small-pore zeolite is 0.1 to 20 μm.

8. The SCR-active material according to claim 1, wherein it is present in powder form.

9. The SCR-active material according to claim 1, wherein it is present (A) in the form of a coating on a carrier substrate or (B) in the form of a substrate that was extruded in combination with a matrix component.

10. The SCR-active material according to claim 1, wherein it is present in the form of a coating suspension, said coating suspension further comprises water.

11. A method for purifying exhaust gas of lean-operated combustion engines, wherein the exhaust gas is passed over an SCR-active material according to claim 1.

12. A device for purifying exhaust gas of lean-operated combustion engines, wherein it comprises an SCR-active material according to claim 1, and an injector for providing a reducing agent.

13. The device according to claim 12, wherein the reducing agent is an aqueous urea solution.

14. The device according to claim 12, and further comprising an oxidation catalyst.

15. The device according to claim 12, and further comprising a nitrogen oxide storage catalyst.

16. A method for the production of the SCR-active material according to claim 1, which comprises drying an aqueous suspension of the small-pore zeolites, copper salt, and aluminum oxide or precursor thereof to obtain a dried product, and subsequently calcining the dried product.

17. The method according to claim 16, wherein the drying is by spray drying.

18. The method according to claim 16, wherein the calcining is performed in an air or in an air/water atmosphere at temperatures between 500° C. and 900° C.

19. The method according to claim 16, which comprises placing the small-pore zeolite in water, then adding a soluble copper salt while stirring, and then adding the aluminum oxide or precursor thereof.

20. The SCR-active material according to claim 9, wherein the carrier substrate of (A) comprises a combination of an inert matrix component and the SCR-active material.

* * * * *